(12) United States Patent
Hodge et al.

(10) Patent No.: US 7,451,064 B2
(45) Date of Patent: Nov. 11, 2008

(54) SYSTEM AND METHOD FOR LOGGING HARDWARE USAGE DATA, AND USES FOR SUCH LOGGED HARDWARE USAGE DATA

(75) Inventors: Hunt Hodge, The Woodlands, TX (US); Gary L. Stephens, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 400 days.

(21) Appl. No.: 10/959,733

(22) Filed: Oct. 6, 2004

(65) Prior Publication Data

US 2006/0075286 A1   Apr. 6, 2006

(51) Int. Cl.
*G06F 3/02* (2006.01)

(52) U.S. Cl. .................. 702/187; 702/184; 702/188; 702/199

(58) Field of Classification Search ............... 702/117, 702/119, 127, 184, 187–189, 199; 345/179; 346/179; 701/213; 709/220, 224; 714/20; 718/104

See application file for complete search history.

(56) References Cited

U.S. PATENT DOCUMENTS

| | | | |
|---|---|---|---|
| 5,155,680 A | 10/1992 | Wiedemer | |
| 5,491,791 A | 2/1996 | Glowny et al. | |
| 5,639,163 A | 6/1997 | Davidson et al. | |
| 5,668,944 A | 9/1997 | Berry | |
| 5,684,945 A * | 11/1997 | Chen et al. | 714/20 |
| 5,699,505 A | 12/1997 | Srinivasan | |
| 5,758,071 A | 5/1998 | Burgess et al. | |
| 5,961,215 A | 10/1999 | Lee et al. | |
| 6,000,040 A * | 12/1999 | Culley et al. | 714/31 |
| 6,075,050 A | 6/2000 | Singh | |
| 6,085,244 A * | 7/2000 | Wookey | 709/224 |
| 6,170,064 B1 | 1/2001 | Lee | |
| 6,622,116 B2 | 9/2003 | Skinner et al. | |
| 6,760,017 B1 * | 7/2004 | Banerjee et al. | 345/179 |
| 6,961,716 B2 * | 11/2005 | Rhodes | 705/52 |
| 7,028,301 B2 * | 4/2006 | Ding et al. | 718/104 |
| 7,042,852 B2 * | 5/2006 | Hrastar | 370/310 |
| 2001/0003172 A1 | 6/2001 | Skinner et al. | |
| 2002/0095601 A1 | 7/2002 | Hind et al. | |
| 2004/0044605 A1 | 3/2004 | Kress Bodin et al. | |
| 2004/0093243 A1 | 5/2004 | Bodin et al. | |

* cited by examiner

*Primary Examiner*—Eliseo Ramos-Feliciano
*Assistant Examiner*—Felix Suarez (57) ABSTRACT

According to at least one embodiment, a system comprises at least one computer system having a Basic Input/Output System ("BIOS"). The system further comprises means for collecting, via the BIOS, data about usage of at least one hardware component of the at least one computer system. According to at least one embodiment, a method comprises harvesting, from each of a plurality of computer systems, logged data regarding usage of hardware components of the computer systems. The method further comprises generating usage profile for the plurality of computer systems based at least in part on the harvested logged data.

39 Claims, 4 Drawing Sheets

SYSTEM AND METHOD FOR LOGGING HARDWARE USAGE DATA, AND USES FOR SUCH LOGGED HARDWARE USAGE DATA

TECHNICAL FIELD

This disclosure relates generally to logging data regarding usage of a computer system, and more particularly to systems and methods for logging data regarding usage of hardware components of a computer system and using the logged data to, for example, generate usage profiles.

BACKGROUND OF THE INVENTION

Computer systems have been developed to log various information. For example, certain systems, such as that of U.S. Pat. No. 6,085,244 titled "Dynamic Test Update in a Remote Computer Monitoring System," have been developed for monitoring computer systems and storing system diagnostic information resulting from execution of diagnostic programs. Thus, this type of monitoring technique uses diagnostic programs that periodically execute to collect such diagnostic information as error messages from log files, system crash data, list of installed patches and revisions, hardware configuration (RAM, disk space, SCSI devices), and administrative problems (full disk partitions, low swap space).

Also, certain computer devices have been developed to include an integrated self-monitoring component for monitoring a certain aspect of the computer device. For instance, U.S. Pat. No. 5,961,215 titled "Temperature Sensor Integral with Microprocessor and Methods of Using Same" provides a temperature sensor that is integral with a microprocessor, where the temperature sensor can be used to reduce the clock speed of the microprocessor when the microprocessor temperature exceeds a predetermined temperature or to store temperature-indicating data in non-volatile memory of the microprocessor to provide a thermal history of the microprocessor.

Some systems include techniques for logging information about a user's input (e.g., keystrokes) to the computer system. Such techniques may be included for security or other monitoring purposes. For instance, certain systems include techniques for logging usage of a given software application program by a user in order to provide time/usage-based billing to the user, such as in U.S. Pat. No. 5,155,680 titled "Billing System for Computing Software."

As another example, U.S. Pat. No. 6,622,116 titled "Time and Activity Tracker" discloses a time tracking system to document how long a user has been working on a specified task by logging information regarding the user's computer activity such as keyboard and mouse activity, file access activity, etc. to tabulate a chronological summary of the user's activities, which enables such information to be used for proving the amount of work the user performed on a given project. However, the above techniques fail to adequately log usage of hardware components of a computer system by a user. Further, the above techniques have not provided effective use of the logged information by a computer manufacturer for making design decisions regarding the appropriate computer system for its customers.

SUMMARY OF THE INVENTION

According to at least one embodiment, a system comprises at least one computer system having a Basic Input/Output System ("BIOS"). The system further comprises means for collecting, via the BIOS, data about usage of at least one hardware component of the at least one computer system.

According to at least one embodiment, a method comprises collecting, via BIOS of at least one computer system, data about usage of at least one hardware component of the at least one computer system. The method further comprises logging the hardware usage data to non-volatile memory of the at least one computer system.

According to at least one embodiment, computer-executable software code stored to computer-readable medium is provided. The computer-executable software code comprises code for receiving logged data regarding usage of hardware components of a plurality of computer systems, and code for generating a usage profile for the plurality of computer systems based at least in part on the received logged data.

DETAILED DESCRIPTION

Computer manufacturers have traditionally developed computer designs for customers with relatively little information regarding how its customers actually use the hardware components of the computers. Usage of hardware components may vary greatly from customer to customer. For instance, certain customers may run their laptop computers on battery power much more frequently than other customers. As another example, certain customers may open and close the lids of their laptop computers much more frequently than other customers. As still another example, certain customers may power their computers on/off much more frequently than other customers. When designing a computer system for a given customer, when determining the optimal one of a plurality of different computer systems to recommend for a given customer, or when attempting to diagnose causes of problems occurring in a given customer's computer system, relatively little information has been available regarding how the given customer uses the hardware components of its computer system.

Embodiments described below provide systems and methods for logging usage information for a computer system. Particularly, in certain embodiments, the usage information details how a user utilizes hardware components of the computer system. For instance, a laptop computer system may log data detailing the number of times the user has opened and closed its lid, how often the user has used battery power, how many times the user has cycled power to the system, etc. According to at least one embodiment, a novel logging mechanism is implemented in the BIOS (Basic Input/Output System) of the computer system for logging various data regarding usage of the computer system's hardware.

Further, in certain embodiments, the logged usage information (which may be logged either via the novel logging mechanism disclosed herein and/or via other logging mechanisms now known or later discovered) is harvested and used to generate a usage profile for the user of the computer system. Such usage information may be logged for a plurality of computers (e.g., all computers from a given manufacturer, or a certain community of computers, such as the computers of a given business organization) and the logged usage information for the plurality of computers may be harvested to generate usage profiles for the users of those computers. Such usage profiles may then be analyzed to determine how the computer design may be modified/optimized to conform to the users' usage of such computers. For example, for customers with a usage profile indicating a high occurrence of battery usage, a computer system having an improved battery life may be designed for those customers. Further, a battery warranty may be recommended to those customers that depend heavily on battery usage. As another example, for customers with a usage profile indicating a high occurrence of opening and closing the lid of their laptop computer, a computer system having an improved lid opening/closing system (e.g., improved hinge, etc.) may be designed for those customers. That is, the manufacturer may utilize the usage profile to determine how best to focus its efforts in improving the computer system (or future design) in accordance with the customer's usage.

In accordance with certain embodiments provided herein, a plurality of different computer systems may each include a hardware usage mechanism for logging data about their respective hardware usages, and such logged data may be used for deriving a usage profile for the plurality of computer systems. Thus, for example, a hardware usage profile may be derived for all computers of a given manufacturer, all computers of a certain business organization. It should be understood that as used herein business organization refers to any organization (e.g., company, educational entity, governmental entity, etc.), any department of an organization, or any other subset of an organization.

In accordance with certain embodiments, the logged hardware usage information is used to maintain a user profile database to aid a computer manufacturer to drive product improvements by allowing statistical analysis of customer environments plus assist product engineers and third level support in debug efforts regarding problems being encountered by a customer. Thus, in certain embodiments, hardware usage data is collected to (1) build up a user usage profile to create a statistical database to assist a manufacturer in System Validation Test Plan testing and (2) build up a system failure database to help the manufacturer improve its future designs. Of course, various other uses for the logged hardware usage data will be apparent.

An example of one usage of the logged hardware usage data would be in battery warranty cost savings. The battery warranty is typically one year, and since battery life is a function of charge/discharge cycles a manufacturer can determine a battery tread allowance for warranty purposes. The affect would be to lower warranty cost and increase warranty life. This data could also be used by the manufacturer to fine tune the System Validation Test Plan to match its customer's environment.

As described above, techniques have been provided for logging such information as a user's input (e.g., keystrokes) to a computer system, logging usage of a given software application program by a user (e.g., for time/usage-based billing purposes), logging results from diagnostic programs running on a computer system, and logging temperature of a microprocessor in a computer system. However, these techniques fail to adequately log usage of hardware components of a computer system by a user. Moreover, these techniques have failed to use the logged information to develop usage profiles for use by a computer manufacturer in making design decisions.

In certain embodiments provided herein, "direct" hardware usage by a user is logged. Direct hardware usage refers to usage of hardware that is directly initiated by a user, such as a user opening or closing the lid of a laptop computer, the user running a laptop computer on battery power, the user powering on or off the computer, the user docking or undocking a laptop computer to/from a docking station, and the user connecting or disconnecting a peripheral (e.g., the user connecting or disconnecting an input device, such as a mouse, keyboard, scanner, etc., or an output device, such as a display, printer, external storage device, etc.), as examples. In such direct hardware usages, the user's action is intended to have the resulting effect on the computer's hardware, such as opening/closing the lid, running on battery power, powering off/on the computer, docking/undocking the computer, connecting/disconnecting peripheral devices, etc. Of course, in some instances, the user may utilize some intermediary process to achieve the desired direct hardware usage, such as interacting with a user interface to power down the computer, as opposed to physically interacting with the hardware (e.g., by pressing a power button). However, because the user's usage directly achieves the intended effect on the hardware (e.g., powering down the computer), such use of an intermediary in this regard is considered as direct hardware usage.

In certain embodiments, "indirect" hardware usage by a user is also logged. Indirect hardware usage refers to usage of hardware that may result indirectly from the user's usage of the computer, such as a microprocessor incurring a larger load and/or increased temperature as a result of a user running a certain application on the computer as an example. In this case, if a user triggers execution of a certain application on a computer, which in turn causes an increased computational load and thus increased temperature of the computer's microprocessor as a result of the microprocessor processing instructions of the application, the result that running such application has regarding increasing the microprocessor's temperature is an effect that is indirect and often unrealized by the user. While the user intends to run the application, the user generally does not intend to increase the microprocessor's temperature.

Figure 1:
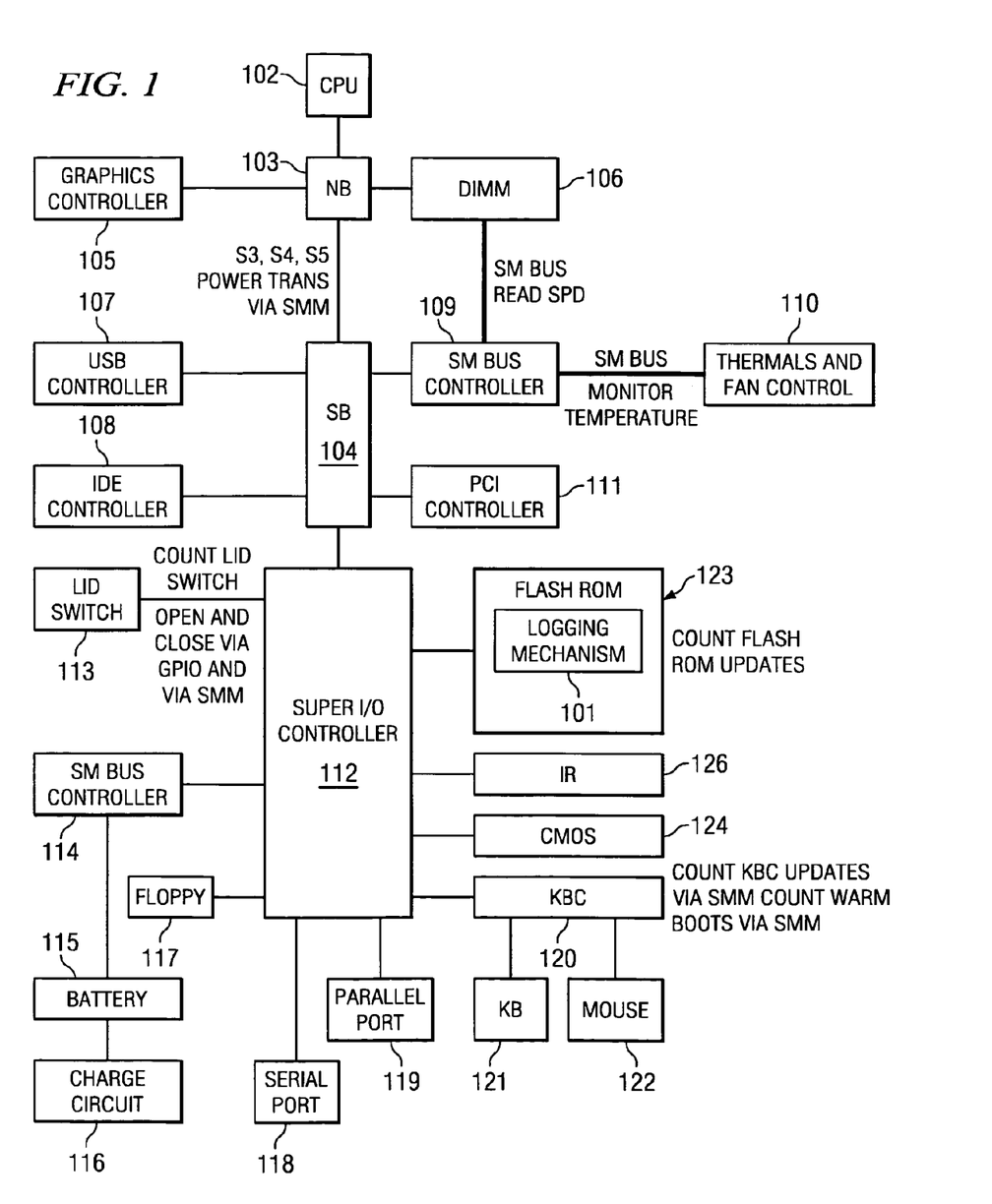
FIG. 1 shows an example laptop computer system implementing one embodiment of logging hardware usage data.

FIG. 1 shows an example laptop computer system 100 implementing one embodiment of logging hardware usage data. Of course, while a specific example embodiment is shown as implemented for a laptop computer, similar embodiments may be implemented on any other processor-based system for logging hardware usage, such as on a personal computer (PC), workstation, personal digital assistant (PDA), mobile telephone, etc. For instance, a similar embodiment may be readily adapted to be implemented on a mobile telephone to log, for example, the number of times the user opens/closes the lid of a "flip-phone," how often the user raises/lowers an antenna on the phone, how often the user connects the telephone to a charger for re-charging the phone's battery, etc. Accordingly, except where specified otherwise, the term "computer system" is used broadly herein and is intended to encompass any processor-based system.

In the example embodiment of FIG. 1, laptop computer system 100 includes a logging mechanism 101 implemented to log hardware usage data as described further below. In this example embodiment, the logging mechanism code 101 is located within the BIOS of the system memory, which in this example is flash ROM 123.

Example laptop computer system 100 includes central processing unit (CPU) 102, north bridge 103, south bridge 104, graphics controller 105, dual in-line memory module (DIMM) 106, Universal Serial Bus (USB) controller 107, integrated drive electronics (IDE) controller 108, system management bus ("SMBus") controller 109, thermals and fan control 110, peripheral component interconnect (PCI) controller 111, super input/output (I/O) controller 112, lid switch 113, SMBus controller 114, battery 115, charge circuit 116, floppy drive 117, serial port 118, parallel port 119, keyboard controller (KBC) 120, keyboard (KB) 121, mouse 122, flash Read Only Memory (ROM) 123, complementary metal-oxide semiconductor (CMOS) memory 124, and infrared radiation (IR) port 126. In the example of FIG. 1, the example system is an IBM compatible mobile computer system (e.g., laptop) having an INTEL architecture system and an Advanced Configuration and Power Interface (ACPI)-based Windows™ Operating System (OS).

The example system 100 implements a novel logging mechanism 101 within the system BIOS. However, as described further below, in certain embodiments hardware usage data may be collected via other logging mechanisms. For instance, in certain embodiments, hardware usage data may be collected via the operating system (OS) using known techniques available through Windows Management Instrumentation (WMI), Self-Monitoring, Analysis and Reporting Technology (SMART), and/or ACPI, as examples, instead of or in addition to collecting hardware usage data at the BIOS level.

Of course, while FIG. 1 shows an example laptop system architecture on which an embodiment of hardware usage logging may be implemented as described further herein, the embodiments described herein are not limited to this example architecture. Rather, other system architectures now known or later developed may be utilized and/or various elements may be added to and/or removed from the example architecture of FIG. 1. For instance, embodiments described herein may be readily adapted for use in a system architecture that is not IBM-compatible, not having an INTEL architecture system, and/or not utilizing an ACPI-based Windows™ OS. The specific elements shown in the example laptop 100 of FIG. 1 are described further below, but again this architecture is intended merely as an example and the embodiments for logging hardware usage described herein may be readily adapted for use in other architectures.

CPU 102 generally includes one or more processors (e.g., microprocessors) that form a unit containing logic circuitry that performs the instructions of the computer's programs, as is well-known in the art. North bridge 103 and south bridge 104 are two main components that many processor architectures are designed to include, such as with many of the processors available from INTEL Corporation. In many system designs, north bridge 103 is essentially the main component of the motherboard and is typically the only motherboard circuit besides the processor that normally runs at full motherboard (processor bus) speed. North bridge 103 connects to such high-speed components as graphics controller 105, and DIMM 106.

In many system designs, south bridge 104 is the lower speed component in the chipset. For instance, south bridge 104 generally connects to the PCI bus (via PCI controller 111), and normally contains the dual IDE hard disk controller interfaces 108 and USB interface 107. Further, in this example, south bridge 104 connects to SMBus controller 109, which (among other things) monitors temperature via thermals and fan control 110. South bridge 104 is also communicatively coupled to super I/O controller 112. Generally, super I/O controller 112 is a chip that is responsible for controlling lower-speed peripherals found in many computer systems, such as floppy drive 117, serial port 118, parallel port 119, flash ROM 123 and IR port 126. Since these I/O devices have been mostly standardized, they are virtually the same in most computer architectures, and thus implementing the super I/O controller 112 which integrates the control of these various devices may simplify the overall architecture. Of course, such a super I/O controller may be replaced with separate I/O controllers in alternative architectures. Super I/O controller 112, in the example of FIG. 1, is also communicatively coupled to lid switch 113, SMBus controller 114, and KBC 120.

In accordance with this example embodiment, the flash ROM 123 collects data based on interrupt calls, System Management Interrupt (SMI), ASL, SMbios, ACPI, and/or SMART. For instance, certain embodiments System Management Mode (SMM) programming (also referred to herein as "SMBIOS") is utilized by logging mechanism 101 in the system BIOS of flash ROM 123 for collecting certain hardware usage information. Such BIOS-based mechanism for logging hardware usage is a novel technique that is more fully described herein below. Additionally or alternatively, in certain embodiments other logging techniques may be employed, such as techniques that collect hardware usage data through OS calls. Irrespective of the hardware usage collection techniques employed, novel uses for such collected data, such as generating customer usage profiles, are described further herein.

According to one example implementation, Table 1 below shows types of data that is logged, as well as where such data is stored and the mechanism used for collecting the data. Of course, other storage locations and/or logging mechanisms may be used in alternative implementations, and different data may be logged in alternative implementations.

TABLE 1

| Data Collected | Storage | Logging Mechanism |
| --- | --- | --- |
| System Serial No. | Flash ROM | SMBIOS |
| System BIOS Revision | Flash ROM | SMBIOS |
| KBC Revision | F000 Shadow RAM | SMBIOS |
| Number of Lid Closures | Flash ROM | SMI or ASL |
| Total number of power downs | CMOS | SMI |
| Number of forced power downs | CMOS | KBC |
| Number of Cold Boots | CMOS | ASL |
| Number of S3 | CMOS | SMI or ASL (if ACPI-based OS) |
| Number of S4 | CMOS | SMI or ASL (if ACPI-based OS) |
| Number of Quick Restore | CMOS | WMI |
| Number of Cold Dock | CMOS | SMI |
| Number of Hot Dock | CMOS | SMI or ASL (if ACPI-based OS) |
| Number of Warm Dock | CMOS | SMI or ASL (if ACPI-based OS) |

TABLE 1-continued

| Data Collected | Storage | Logging Mechanism |
|---|---|---|
| Number of BIOS Updates | Flash ROM | E822 calls |
| Number of FBDA Updates | Flash ROM | Write FBDA calls |
| Number of KBC Updates | Flash ROM | CheckMicroFlash calls |
| Number of External Monitor Turn On | Flash ROM | WMI |
| Number of External Keyboard Connected | CMOS | KBC may record changes from "unknown" device to "keyboard attached." |
| Number of External Mouse Connected | CMOS | KBC may record changes from "unknown" device to "mouse attached." |
| Number of PCMCIA (Personal Computer Memory Card International Association) Insertions | CMOS | WMI |
| Number of PCMCIA Removals | CMOS | WMI |
| Number of Wireless Link Turn Off | CMOS | SMI |
| Total Time of Wireless on AC | CMOS | WMI |
| Total Time of Wireless on DC | CMOS | WMI |
| Max CPU Temperature | CMOS | ASL (if ACPI-based OS) |
| Max HDD Temperature | CMOS | Read SMART attribute |
| Max Battery Temperature | CMOS | KBC may monitor battery temperature |
| Time Duration at Max CPU Temperature | CMOS | WMI |
| Time Duration at Max HDD Temperature | CMOS | WMI |
| Time Duration at Max Battery Temperature | CMOS | KBC |
| Number of times POST attempted but did not hand-off to OS | Flash ROM | ASL |
| Last Successful POST Resulting in Hand-Off to OS | CMOS | ASL |
| POST Failure Code | CMOS | ASL |

In the example system of FIG. 1, CMOS 124 and flash ROM 123 are used for temporary data storage of the collected hardware usage data. In one embodiment, data to be updated more that 1000 times is stored temporarily in CMOS 124, while data to be updated less than 1000 times is stored temporarily in flash ROM 123. In the example architecture of FIG. 1, CMOS access is through I/O ports 70h (index) and 71h (data).

A flash memory device, such as flash ROM 123, is specified to be programmed a finite amount of time for reliability (typically approximately 8000 times). Therefore, in order to use flash ROM 123, it is desirable to store any changed data in temporary storage (reserved system memory range) at run time until the system is shut down. This would enable the flash ROM 123 to be programmed fewer times to avoid the flash reliability problem. In other words, as hardware usage data is updated during run-time of the system (responsive to occurrence of a given hardware usage that is being logged), the updated data is logged in temporary storage such as CMOS 124, and such data is written to the system ROM, i.e., flash ROM 123, upon system shutdown. While this data storage strategy is employed for certain embodiments, other data storage strategies may similarly be employed for logging the collected hardware usage data in a desired manner.

In accordance with certain embodiments, the collected hardware usage data may be harvested from the monitored system and presented to a user. In accordance with one embodiment, for example, the flash ROM 123 will write the collected data to a Windows Management Instrumentation (WMI) file. An application program, which may be executing on a separate computer system (such as on a manufacturer's computer system), will receive the WMI data file, process it and display it to a user for analysis. Examples of the resulting processed information (e.g., usage profiles for one or more computer systems) that may be presented to and analyzed by a user for one or more computer systems are described further below. By specifying WMI, the system management information can be accessed in an enterprise-computing environment. WMI is a component of the Microsoft® Windows® operating system and is the Microsoft implementation of Web-Based Enterprise Management (WBEM), which is an industry initiative to develop a standard technology for accessing management information in an enterprise environment. WMI uses the Common Information Model (CIM) industry standard to represent systems, applications, networks, devices, and other managed components. WMI can be used to automate administrative tasks in an enterprise environment. Of course, the collected data may be written to other types of files (other than WMI) in alternative embodiments if so desired.

As shown in the example implementation of FIG. 1, various types of hardware usage may be detected and logged by logging mechanism 101. For instance, lid switch 113 may be monitored to count the number of times such lid switch 113 is opened and closed via GPIO and SMM. GPIO is General Purpose Digital Input/Output signal. It can be programmed as an input or output. In the case of the Lid Closure Count the GPIO is programmed as an input signal and SMM is used by logging mechanism 101 to count the number of times the LID switch 113 is opened and closed.

Further, the number of warm boots to the system may be counted by KBC 120 via SMM. In this example embodiment, SMM is intended to be used for advanced power-management features and other operating-system-independent functions. The chipset is programmed to recognize many types of events and timeouts. When such an event occurs, the chipset asserts the SMI# input pin. At the next instruction boundary, the microprocessor saves its entire state and enters SMM.

As the microprocessor enters SMM, it asserts an output pin, SMIACT#. This pin serves notice to the chipset that the microprocessor is entering SMM. SMI# can be asserted at any time, during any process operating mode, except from within SMM itself. The chipset recognizes SMIACT# and redirects all subsequent memory cycles to a protected area of memory, reserved specifically for SMM. Immediately after receiving the SMI# input and asserting the SMIACT# output, the microprocessor begins to save its entire internal state to this protected memory area.

After the microprocessor state has been stored to memory, the special SMM handler begins to execute. In one example implementation, the processor is in real mode, all segments have 4-GB limits, and all segments are read/writable. After the SMM code has executed, it returns to the previous operating environment. The program executes the RSM instruction to exit SMM. RSM reads the microprocessor state data from the state save map, and restores the entire microprocessor state. Like LOADALL, RSM performs virtually no checks on the data in the state save map. Upon completion of RSM, the entire microprocessor state has been redefined, and the previous program resumes execution right where it left off.

Various other types of "direct" hardware usages may be similarly detected in this system, such as running the system on battery power, the user docking or undocking the laptop computer to/from a docking station, the user connecting or disconnecting a peripheral, etc. (such as the various types of "direct" hardware usages of Table 1 above). Thus, various direct hardware usages by a user of system 100 may be detected and logged by logging mechanism 101.

Further, certain indirect hardware usages may be detected and logged by logging mechanism 101. For instance, system temperature may be monitored via thermals 110. Various examples of other types of "indirect" hardware usages that may be detected in this system are included in Table 1 above.

An example log of hardware usage data that may be collected by logging mechanism 101 in accordance with one embodiment is shown in Table 2 below.

TABLE 2

| Data | Value |
| --- | --- |
| System Serial Number | 23e10293812039 |
| System BIOS Revision | 3.2 |
| KBC Revision | 1.4 |
| Number of Lid Closures | 74 |
| Number of Lid Closures while Machine Remains in S0 | 16 |
| Total Number of Power Downs | 114 |
| Number of Forced Power Downs | 28 |
| Number of Cold Boots | 47 |
| Number of S3 | 19 |
| Number of S4 | 13 |
| Number of Quick Restore | 0 |
| Number of Cold Dock | 36 |
| Number of Hot Dock | 3 |
| Number of Warm Dock | 1 |
| Number of BIOS Updates | 4 |
| Number of FBDA Updates | 2 |
| Number of KBC Updates | 0 |
| Number of External Monitor Turn On | 42 |
| Number of External Keyboard Connected | 14 |
| Number of External Mouse Connected | 14 |
| Number of PCMCIA Insertions | 4 |
| Number of PCMCIA Removals | 3 |
| Number of Wireless Link Turn Off | 11 |
| Total Time of Wireless on AC | 134 hr., 22 min. |
| Total Time of Wireless on DC | 54 min. |
| Max CPU Temperature | 60° C. |
| Max HDD Temperature | 50° C. |
| Max Battery Temperature | 45° C. |
| Time Duration at Max CPU Temperature | 2 min. |
| Time Duration at Max HDD Temperature | 0 min. |
| Time Duration at Max Battery Temperature | 2 hr., 32 min. |
| Number of times POST attempted but did not hand-off to OS | 5 |
| Last Successful POST Resulting in Hand-Off to OS | 23H |
| POST Failure Code | 2EH |

Each of the above example fields of Table 2 can be collected/logged by a computer system in the manner described above in conjunction with FIG. 1, for instance. The values included in Table 2 above are merely examples of data that may be logged for a given system. Further, the fields included in Table 2 are intended merely as examples and additional or alternative data may be included in the log in alternative embodiments. For instance, the number of times a laptop is run on battery power may be logged, a timer may be used to log the total amount of time that the laptop is run on battery power and/or to log the amount of time the laptop is run on battery power each instance that it is removed from AC power (thus, the logged information may indicate how long the user typically runs the laptop on battery power to, for example, determine if the battery is typically substantially drained of power before it is recharged by the user). Similarly, instead of or in addition to collecting the number of times a laptop is docked/undocked to/from a docking station, a timer may be used to log the amount of time that the laptop is docked versus undocked.

Figure 2:
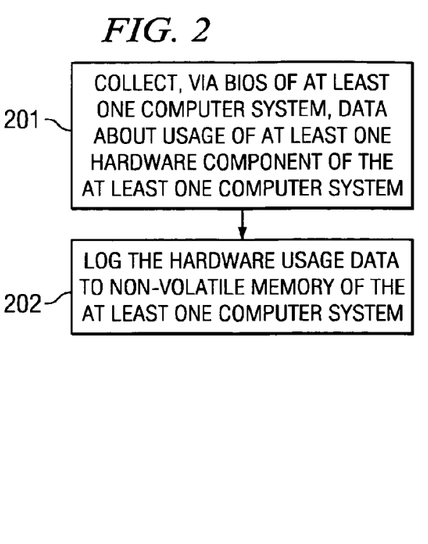
FIG. 2 shows an operational flow according to one embodiment for logging hardware usage data in a computer system, such as by the logging mechanism of the example system of FIG. 1.

FIG. 2 shows an operational flow according to one embodiment for logging hardware usage data in a computer system, such as by logging mechanism 101 of system 100 of FIG. 1. In operational block 201, for at least one computer system, data about usage of at least one hardware component of such computer system(s) is collected via BIOS of the computer system(s). For instance, the lid switch 113 is the example system of FIG. 1 and detects the opening/closing of the lid. The BIOS keeps track of the number of open/closed cycles through SMM. That is, logging mechanism 101 of system 100 collects data about the number of times the lid of the system 100 is opened and closed. In operational block 202, the hardware usage data is logged to non-volatile memory of the corresponding computer system(s). For example, the number of times the lid of the system 100 is opened and closed may be logged by logging mechanism 101 to flash ROM 123.

Figure 3:
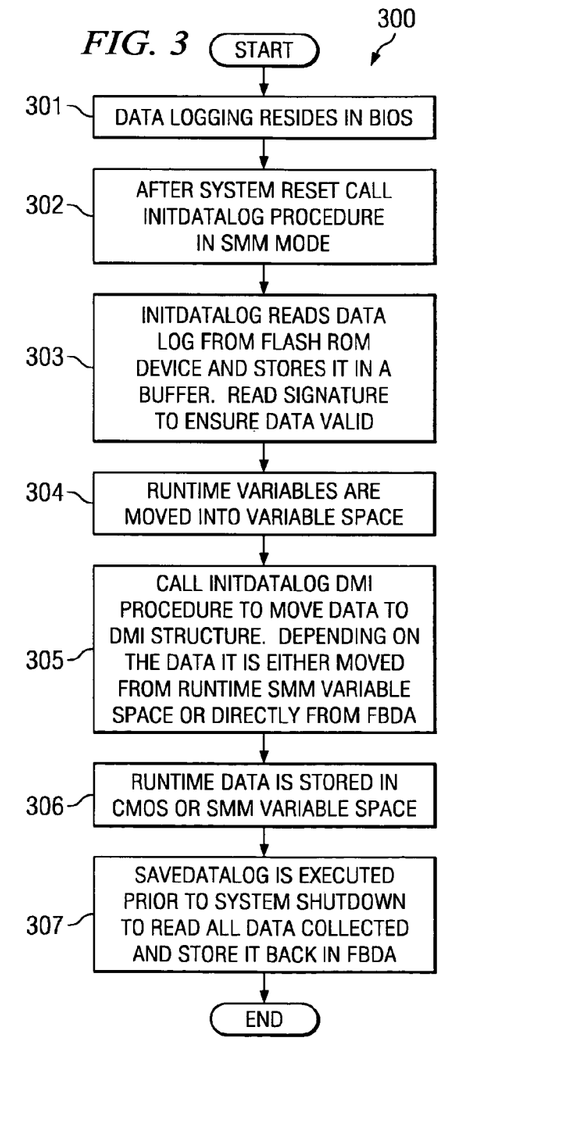
FIG. 3 shows a more detailed operational flow diagram for one example embodiment for logging hardware usage.

FIG. 3 shows a more detailed operational flow diagram 300 for one example embodiment for logging hardware usage. Most any kind of data can be saved and retrieved by using the data log structure that has been set up. For example, the number and type of power downs, lid switch opens and closes, and the different types of Flash writes including the FBDA (Flash BIOS Data Area) and micro controller may be collected in certain embodiments. Data is kept in different places when the system is active and kept in the FLASH FBDA and CMOS when the system is inactive. In block 301, data logging (e.g., logging mechanism 101) resides in BIOS of the computer system. In block 302, in response to a system reset, the logging mechanism 101 calls InitDataLog procedure in SMM mode. In block 303, the InitDataLog procedure reads a data log from a flash ROM device (e.g., flash ROM 123 of system 100) (the data log is written to the flash ROM from the previous system shutdown) and stores it in a buffer. INIT-DATALOG reads the signature (also called checksum) to make sure data corruption has not occurred and data log is valid. If the known signature does not agree with the read signature the data log is considered invalid or erased and the data log variables are cleared to zero.

In block 304, if the data is considered good, runtime variables are moved to variable space in a SMM structure. In some cases where information is updated in CMOS the (KBC controller update, FBDA) data is updated before it is moved to the SMM structure. CMOS is only used to keep data temporarily between boots where the system may not have the ability to record it in the FBDA before a shutdown occurs. In block 305 logging mechanism 101 calls InitDataLog DMI procedure to move data to DMI structure. A structure is also known as a data field. DMI is Desktop Management Interface software specification. DMI generates a standard framework for managing and tracking components in a desktop PC, notebook or server. The next step in the process is a procedure called InitDataLogDMI (POSTDMI.ASM) that moves the data to the DMI structure. Depending on the data it is either moved from the run time SMM variable space (a region of memory reserved for SMM programming) or directly from FBDA. It should be noted that regardless, when the DMI data is read the counts are current only at the time of system boot. This is because the DMI structure is placed in the F000 run time segment during POST. If the current data at any particular time is desired, then the system can be shut down and rebooted to update the data log.

In block 306, runtime data is stored in CMOS (e.g., CMOS 124 of system 100) or SMM variable space. In block 307, SaveDataLog is executed prior to system shut down to read all data collected and store it back in FBDA. The data collected in FBDA in one example implementation includes the following data:

1. count of the number of keyboard controlled (KBC) updates;
2. count of the number of lid switch events;
3. count of the number of warm boots;
4. save number of (S5) power transitions (power off);
5. count of the number of standby power downs;
6. count of the number of FBDA updates; and
7. count of the number of Flash BIOS updates.

Of course, as described above, various other data in addition to or instead of the above data may be logged by the BIOS logging mechanism in other implementations.

In accordance with certain embodiments provided herein, logged hardware usage information that is logged for one or more computer systems (such as that logged by the BIOS logging mechanism 101 of system 100 and/or any other logging mechanism now known or later discovered) is harvested by another computer system (e.g., a manufacturer's computer system) and used to generate a usage profile. Further, in certain embodiments, logged hardware usage information that is logged to each of a plurality of different computer systems may be harvested by another computer system and used to generate a usage profile for the plurality of different computer systems. For instance, each computer system of a given customer (e.g., a given business organization) may include the logging mechanism to log its respective hardware usage data, and the hardware usage data from all of such customer's computer systems may be periodically collected by a manufacturer's computer system to generate a usage profile for that customer. Table 3 below shows an example of usage profiles that may be collected for a set of monitored computer systems (i.e., computer systems that each include a hardware usage logging mechanism).

TABLE 3

| User A | Company X | Accounting Department | Usage Profile Info. |
|---|---|---|---|
| User B | Company X | Sales Department | Usage Profile Info. |
| User C | Company Y | Customer Service Department | Usage Profile Info. |
| User D | Company Y | Sales Department | Usage Profile Info. |
| ... | ... | ... | ... |

As shown in the example of Table 3, usage profile information, such as that of Table 2 above, may be harvested and associated with a customer. For instance, the usage profiles may be associated with a corresponding user, a corresponding company, and/or a corresponding division/department of the company. In the example of Table 3, the first row of such table identifies that the collected hardware usage information corresponds to a given user, User A, which may instead be a given computer of the customer, such as computer ID 123456. The first row further includes a field that identifies that this user/computer system is of "Company X", and a field is included that identifies that this user/computer system is utilized in the "Accounting Department" of such Company X. The final field of the first row includes the corresponding hardware usage data that was logged for this user/computer, such as the example usage information of Table 2 above. The following rows of Table 3 likewise include a field identifying a given user/computer system, a corresponding company, a corresponding department of the company, and the corresponding logged hardware usage data for such user/computer system.

Thus, the usage profiles may be utilized to determine proper design considerations for a given user, a given company (based on a plurality of its users, such as users A and B of Company X in Table 3), and/or a given department of a company (e.g., all users of the Accounting Department of Company X in Table 3). In other words, the harvested data of Table 3 may be used to generate a usage profile for all users of Company X, or all users of the Accounting Department of Company X, or all users of all Accounting Departments across various different companies, as examples. Thus, the harvested information may be used for determining the proper design considerations for a customer's individual users, the customer's specific departments, etc. For instance, the manufacturer may use this information to suggest an appropriate computer system design for use in a company's accounting department based on the usage profile of that company's accounting department and/or based on usage profiles of users across accounting departments of various different companies. As one example, the average amount of time that a laptop computer system is run on battery power by users in the accounting department of Company X may be determined from the corresponding logged hardware usage information, and such information may be used to design and/or suggest a given computer system that is best suited for serving the battery usage needs of the accounting department of Company X. Thus, this provides an example of generating a usage profile for a business organization (e.g., company, department, etc.) that is of interest.

Figure 4:
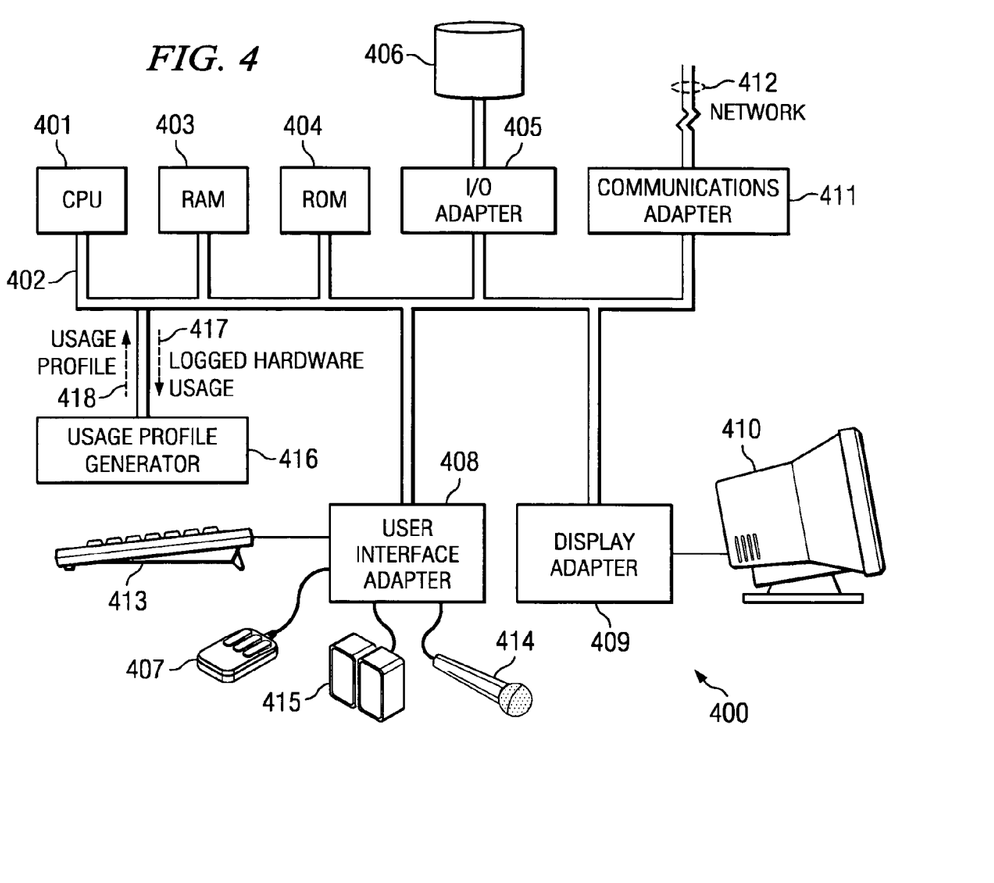
FIG. 4 shows an example computer system adapted according to an embodiment for receiving (or "harvesting") hardware usage information from one or more computer systems (such as the example computer system of FIG. 1) and generating a usage profile for such computer system(s)

FIG. 4 illustrates an example computer system 400 adapted according to an embodiment for receiving (or "harvesting") hardware usage information from the logging mechanism of one or more monitored computer systems (such as computer system 100 of FIG. 1) and generating a usage profile for such computer system(s). For instance, computer system 400 may be implemented at a manufacturer's site for receiving logged hardware usage information from computer systems manufactured by such manufacturer (e.g., computer system 100 of FIG. 1). While an example computer system 400 is shown in FIG. 4 and described further below, embodiments described herein for receiving logged hardware usage information and generating usage profiles are not limited to this example architecture, but instead any suitable computer system architecture now known or later discovered that is capable of supporting the operations described herein may be employed.

In the example system 400 of FIG. 4, central processing unit (CPU) 401 is coupled to system bus 402. CPU 401 may be any general purpose CPU. CPU 401 may execute the various logical instructions for receiving ("harvesting") logged hardware usage data from one or more computers and generating a usage profile for such computer(s), as described further herein. For example, CPU 401 may execute machine-level instructions according to the exemplary operational flows described below in conjunction with FIGS. 5 and 6.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, such as usage profile generator 416 described below, as is well known in the art.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information thereto. For example, logged hardware usage information may be received from the corresponding computer(s) in any suitable manner. For instance, in one embodiment, such logged hardware usage information that is stored to a given computer system (e.g., computer system 100 of FIG. 1) may be retrieved by system 400 by communicatively coupling the motherboard of such given computer system to system 400 (e.g., via a USB port of system 400 (not shown in FIG. 4)). As another example, logged hardware usage information that is stored to a given computer system (e.g., computer system 100 of FIG. 1) may be retrieved by system 400 by communicatively coupling system 400 (at least temporarily) to such given computer system via network 412.

I/O adapter 405 preferably connects storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for application programs. RAM 403, ROM 404, and/or storage devices 406 may be used for storing computer-executable code for receiving hardware usage information from computer system(s) and generating usage profiles for such computer system(s) in accordance with the embodiments described herein. Communications adapter 411 is preferably adapted to couple computer system 400 to network 412, such as the Internet, an Intranet, the World Wide Web (the "web"), other Wide and/or Local Area Networks (WANs and LANs), wireless network, and combinations thereof, as examples.

User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410.

System 400 includes usage profile generator 416 which is a software application program executable by CPU 401 and operable to receive logged hardware usage data 417 from one or more "monitored" computer systems (e.g., the hardware usage data logged by system 100 of FIG. 1) and generate a usage profile 418 for such monitored computer system(s). As described above, the one or more computer systems (such as computer system 100) may be self-monitored in that they include a hardware usage logging mechanism for logging their own hardware usage. As also described above, the logged hardware usage data 417 may be received via network 412 or otherwise input to computer system 400. Further, the generated usage profile 418 may be stored to RAM 403, RAM 404, storage device(s) 406, and/or to another computer system to which system 400 is communicatively coupled (at least temporarily) via network 412.

Figure 5:
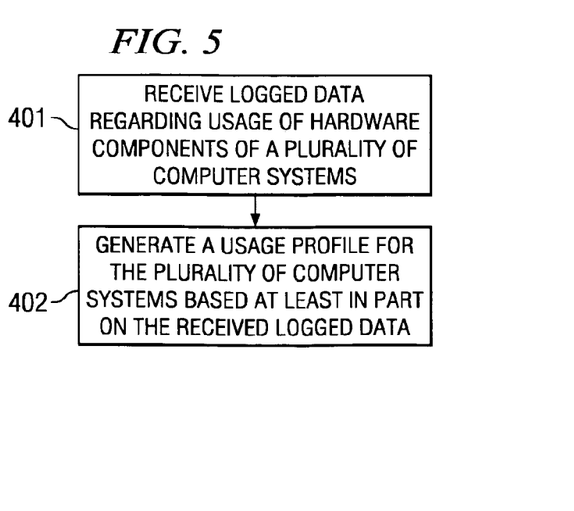
FIG. 5 shows an operational flow according to one embodiment for receiving logged hardware usage data for monitored computer systems and generating a usage profile for those computer systems, such as by the usage profile generator of the example system of FIG. 4.

FIG. 5 shows an operational flow according to one embodiment for receiving logged hardware usage data for monitored computer systems and generating a usage profile for those computer systems, such as by usage profile generator 416 of system 400 of FIG. 4. In operational block 401, the usage profile generator 416 receives logged data regarding usage of hardware components of a plurality of computer systems (e.g., of a plurality of laptop computer systems 100 of a given business organization). For instance, usage profile generator 416 may receive logged data regarding usage of hardware components for each of a plurality of different computer systems of a given customer (e.g., of a given company, of a given department of a given company, or other business organization that is of interest). In operational block 402, the usage profile generator 416 generates a usage profile for the plurality of computer systems based at least in part on the received logged data. Thus, such usage profile for the plurality of computer systems details the hardware usage of the customer, which may be advantageously used by the manufacturer in designing an optimal computer system for the customer, troubleshooting problems being encountered by the customer's computer systems, recommending a suitable computer system for the customer, etc.

Figure 6:
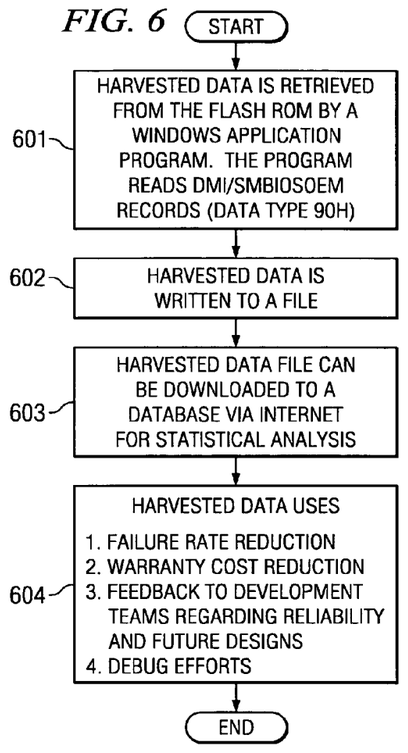
FIG. 6 shows a more detailed operational flow diagram for one example embodiment for receiving logged hardware usage data and generating a usage profile.

FIG. 6 shows a more detailed operational flow diagram for one example embodiment for receiving logged hardware usage data and generating a usage profile. In operational block 601, harvested data is retrieved from the flash ROM (e.g., flash ROM 123 of system 100) of a monitored computer system by usage profile generator 416 (which may, for example, be a WINDOWS® application program). In doing so, the usage profile generator 416 reads DMI/SMBIOS OEM records (data type 90H), which is a data field in the DMI software specification. In operational block 602, the harvested data is written to a file. In operational block 603, the harvested data file is downloaded to a database (e.g., via network 412, such as the Internet) for statistical analysis. In operational block 604, the harvested data may be analyzed for use in such tasks as: 1) failure rate reduction, 2) warranty cost reduction, 3) feedback to development teams regarding reliability and future designs, and/or 4) debug efforts.

Figure 7:
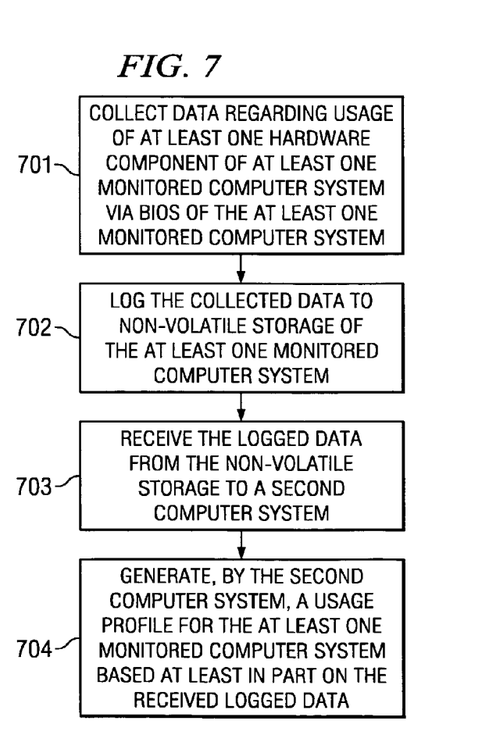
FIG. 7 shows an example operational flow diagram logging hardware usage and generating a usage profile in accordance with one embodiment.

FIG. 7 shows an example operational flow diagram logging hardware usage and generating a usage profile in accordance with one embodiment. In operational block 701, data regarding usage of at least one hardware component of at least one monitored computer system (e.g., computer system 100 of FIG. 1) is collected via a BIOS of the at least one monitored computer system. In operational block 702, the collected data is logged to non-volatile data storage of the at least one monitored computer system. In operational block 703, the logged data is received from the non-volatile storage to a second computer system (e.g., computer system 400 of FIG. 4), and in operational block 704 the second computer system generates a usage profile for the at least one monitored computer system based at least in part on the received logged data.

What is claimed is:

1. A system comprising:

means for collecting, via a basic input/output system (BIOS) of at least one computer system, data about usage of at least one hardware component of said at least one computer system; and means for generating a usage profile, wherein the generating means receives the usage data of said at least one hardware component and processes said received data to generate a usage profile for the at least one computer system, wherein said means for generating a usage profile computes an average of the hardware usage data of a plurality of computer systems.

2. The system of claim 1 wherein said means for collecting uses system management mode (SMM) commands for collecting at least a portion of said data.

3. The system of claim 1 wherein said means for collecting uses General Purpose Digital Input/Output (GPIO) signal for collecting at least a portion of said data.

4. The system of claim 1 wherein said means for collecting collects said data about at least one usage selected from the group consisting of:

number of closures of a lid of said at least one computer system, number of power downs of said at least one computer system, number of times said at least one computer system was docked to a docking station, number of times an external monitored coupled to said at least one computer system was turned on, number of times an external keyboard was coupled to said at least one computer system, number of times an external keyboard was coupled to said at least one computer system, number of times an external mouse was coupled to said at least one computer system, number of times a wireless communication link to said at least one computer system was utilized while said at least one computer system operated on alternating current (AC) power, number of times a wireless communication link to said at least one computer system was utilized while said at least one computer system operated on direct current (DC) power, maximum temperature reached by a central processor unit (CPU) of said at least one computer system, duration of time of said CPU of said at least one computer system spent at said maximum temperature, maximum temperature reached by a hard-disk drive (HDD) of said at least one computer system, duration of time of said HDD of said at least one computer system spent at said maximum temperature, maximum temperature reached by a battery of said at least one computer system, and duration of time of said battery of said at least one computer system spent at said maximum temperature.

5. The system of claim 1 wherein said means for collecting collects direct hardware usage data.

6. The system of claim 5 wherein said direct hardware usage data comprises data about at least one hardware usage selected from the group consisting of:
number of closures of a lid of said at least one computer system, number of power downs of said at least one computer system, number of times said at least one computer system was docked to a docking station, number of times an external monitored coupled to said at least one computer system was turned on, number of times an external keyboard was coupled to said at least one computer system, number of times an external mouse was coupled to said at least one computer system, number of PCMCIA (Personal Computer Memory Card International Association) insertions to the at least one computer system, number of PCMCIA removals from the at least one computer system, number of times a wireless communication link to said at least one computer system was turned on, number of times a wireless communication link to said at least one computer system was turned off, number of times a wireless communication link to said at least one computer system was utilized while said at least on computer system operated on alternating current (AC) power, and number of times a wireless communication link to said at least one computer system was utilized while said at least one computer system operated on direct current (DC) power.

7. The system of claim 1 wherein said means for collecting collects indirect hardware usage data.

8. The system of claim 7 wherein said indirect hardware usage data comprises data about at least one hardware usage selected from the group consisting of:
maximum temperature reached by a central processor unit (CPU) of said at least one computer system, duration of time of said CPU of said at least one computer system spent at said maximum temperature, maximum temperature reached by a hard-disk drive (HDD) of said at least one computer system, duration of time of said HDD of said at least one computer system spent at said maximum temperature, maximum temperature reached by a battery of said at least one computer system, and duration of time of said battery of said at least one computer system spent at said maximum temperature.

9. The system of claim 1 further comprising:
means for collecting, via operating system calls, data about usage of at least one hardware component of said at least one computer system.

10. The system of claim 1 further comprising:
means for at least temporarily communicatively coupling to said at least one computer system and retrieving said collected data.

11. The system of claim 10 further comprising:
said means for generating a usage profile comprises means for generating said usage profile for said at least one computer system based at least in part on said retrieved collected data.

12. The system of claim 1 wherein said means for collecting comprises said means for generating a usage profile.

13. The system of claim 1 wherein the plurality of computer systems comprise all computer systems of a particular model.

14. The system of claim 1 wherein the plurality of computer systems comprise all computers of a give business organization.

15. A method comprising:
collecting, via basic input/output system (BIOS) of at least one computer system, data about usage of at least one hardware component of each of a plurality of computer systems; and
logging the hardware usage data to non-volatile memory of said at least on computer system; and
computing a usage profile for said plurality of computer systems, said usage profile comprising computing an average of the hardware usage data or the plurality of computer systems.

16. The method of claim 15 wherein said collecting comprises:
using system management mode (SMM) commands to collect said data.

17. The method of claim 15 wherein said collecting comprises:
using General Purpose Digital Input/Output (GPIO) signal to collect said data.

18. The method of claim 15 wherein said collecting comprises:
collecting direct hardware usage data.

19. The method of claim 18 wherein said collecting direct hardware usage data comprises collecting at least one selected from the group consisting of:
number of closures of a lid of said at least one computer system, number of power downs of at least one computer system, number of times at least one computer system was docked to a docking station, number of times an external monitored coupled to at least one computer system was turned on, number of times an external keyboard was coupled to at least one computer system, number of times an external mouse was coupled to at least one computer system, number of PCMCIA (Personal Computer Memory Card International Association) insertions to at least one computer system, number of PCMCIA removals from at least one computer system, number of times a wireless communication link to at least one computer system was turned on, number of times a wireless communication link to at least one computer system was turned off, number of times a wireless communication link to at least one computer system was utilized while said at least one computer system operating on alternating current (AC) power, and number of times a wireless communication link to at least one computer system was utilized while said at least one computer system operated on direct current (DC) power.

20. The method of claim 15 wherein said collecting comprises:
collecting indirect hardware usage data.

21. The method of claim 20 wherein said collecting indirect hardware usage data comprises collecting at least one selected from the group consisting of:
maximum temperature reached by a central processor unit (CPU) of at least one computer system, duration of time of said CPU of at least one computer system spent at said maximum temperature, maximum temperature reached by a hard-disk drive (HDD) of at least one computer system, duration of time of said HDD of at least one computer system spent at said maximum temperature, maximum temperature reached by a battery of at least one computer system, and duration of time of said battery of at least one computer system spent at said maximum temperature.

22. The method of claim 15 further comprising:
collecting, via operating system calls, data about usage of at least one hardware component of said at least one computer system.

23. A system comprising.
at least one processor;
Basic Input/Output System (BIOS);
non-volatile data storage; and
hardware usage logging mechanism implemented in said BIOS that is operable to log data to said non-volatile data storage about user-triggered hardware events of said system;
wherein said processor computes an average of user-triggered hardware events of a plurality of systems.

24. The system of claim 23 wherein said hardware usage logging mechanism uses system management mode (SMM) commands to log at least a portion of said data.

25. The system of claim 23 wherein said hardware usage logging mechanism uses at least one General Purpose Digital Input/Output (GPIO) signal to log at least a portion of said data.

26. The system of claim 23 wherein said hardware usage logging mechanisms logs direct hardware usage data.

27. The system of claim 26 wherein said hardware usage logging mechanisms further logs indirect hardware usage data.

28. The system of claim 23 further comprising:
a communication interface for at least temporarily communicatively coupling to a processor-based device to communicate said logged data to said processor-based device.

29. Computer-executable software code stored to computer-readable medium comprising:
code for receiving logged data regarding usage of hardware components of a plurality of computer systems; and
code for generating a usage profile for the plurality of computer systems based at least in part on the received logged data, said usage profile comprising an average of the logged data received from the plurality of computer systems.

30. The computer-executable software code of claim 29 wherein said logged data comprises direct hardware usage data.

31. The computer-executable software code of claim 29 wherein said logged data comprises indirect hardware usage data.

32. The computer-executable software code of claim 29 wherein said logged data comprises data logged by each of said plurality of computer systems for their respective hardware usage, and wherein said code for generating a usage profile for said plurality of computer systems comprises:
code for processing said received data to generate a usage profile for the plurality of computer systems.

33. A method comprising:
harvesting, from each of a plurality of computer systems, logged data regarding usage of hardware components of said computer systems; and
generating usage profile for the plurality of computer systems based at least in part on the harvested logged data, said generating comprisinq computing an average of the harvested logged data.

34. The method of claim 33 further comprising:
logging, via BIOS of each of said plurality of computer systems, said logged data regarding said usage of hardware components of each respective computer system.

35. The method of claim 34 wherein said logging comprises:
using system management mode (SMM) commands to log said data.

36. The method of claim 33 wherein said logged data comprises direct hardware usage data.

37. The method of claim 33 wherein said logged data comprises indirect hardware usage data.

38. The method of claim 33 wherein said plurality of computer systems comprise all computer systems of a particular model.

39. The method of claim 33 wherein the plurality of computer systems comprise all computers of a given business organization.

* * * * *

UNITED STATES PATENT AND TRADEMARK OFFICE
CERTIFICATE OF CORRECTION

| | | |
|---|---|---|
| PATENT NO. | : 7,451,064 B2 | Page 1 of 1 |
| APPLICATION NO. | : 10/959733 | |
| DATED | : November 11, 2008 | |
| INVENTOR(S) | : Hunt Hodge et al. | |

It is certified that error appears in the above-identified patent and that said Letters Patent is hereby corrected as shown below:

In column 14, lines 66-67, in Claim 4, after "system," delete "number of times an external keyboard was coupled to said at least one computer system,".

In column 15, line 43, in Claim 6, delete "least on" and insert -- least one --, therefor.

In column 16, line 17, in Claim 14, delete "give" and insert -- given --, therefor.

In column 16, line 25, in Claim 15, delete "least on" and insert -- least one --, therefor.

In column 16, line 28, in Claim 15, delete "or" and insert -- of --, therefor.

In column 17, line 23, in Claim 23, after "comprising" delete "." and insert -- : --, therefor.

In column 17, line 41, in Claim 26, delete "mechanisms" and insert -- mechanism --, therefor.

In column 17, line 43, in Claim 27, delete "mechanisms" and insert -- mechanism --, therefor.

In column 18, line 29, in Claim 33, delete "comprisinq" and insert -- comprising --, therefor.

Signed and Sealed this

Eighteenth Day of August, 2009

David J. Kappos
*Director of the United States Patent and Trademark Office*